(12) United States Patent
Wren et al.

(10) Patent No.: US 7,415,164 B2
(45) Date of Patent: Aug. 19, 2008

(54) MODELING SCENES IN VIDEOS USING SPECTRAL SIMILARITY

(75) Inventors: Christopher R. Wren, Arlington, MA (US); Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 633 days.

(21) Appl. No.: 11/029,787

(22) Filed: Jan. 5, 2005

(65) Prior Publication Data

US 2006/0147085 A1    Jul. 6, 2006

(51) Int. Cl.
G06K 9/00 (2006.01)
G06K 9/36 (2006.01)
G01R 23/16 (2006.01)
H01S 3/10 (2006.01)

(52) U.S. Cl. ............... 382/280; 382/103; 324/76.21; 372/22

(58) Field of Classification Search ......... 382/100, 382/103, 191, 280, 106, 113, 279; 600/437, 600/458; 704/237, 256.2; 324/76.19, 76.21, 324/76.22, 76.33; 372/22; 348/169
See application file for complete search history.

(56) References Cited

U.S. PATENT DOCUMENTS 5,565,764 A * 10/1996 Priebe et al. ............ 324/76.21
6,312,382 B1 * 11/2001 Mucci et al. ............. 600/437
6,315,730 B1 * 11/2001 Hoff et al. ............... 600/458
6,542,619 B1 * 4/2003 Jafarkhani et al. ....... 382/100
6,683,691 B2 * 1/2004 Grunwald et al. ........ 356/450
6,910,011 B1 * 6/2005 Zakarauskas ............ 704/233
6,987,785 B2 * 1/2006 Sakata et al. ............. 372/22

OTHER PUBLICATIONS

Ross Cutler and Larry S. Davis. Robust real-time periodic motion detection, analysis, and applications. IEEE Transactions on Pattern Analysis and Machine Intelligence, 22(8):781-796, Aug. 2000.

Dominique Dahay and H. L. Hurd. Representation and estimation for periodically and almost periodically correlated random processes. In W.A. Gardner, editor, Cyclostationarity in Communications and Signal Processing. IEEE Press, 1993. http://citeseer.ist.psu.edu/33031.html.

Ismail Haritaoglu, David Harwood, and Larry S. Davis. w4: Who? when? where? what? In Processings of FG'98, Nara, Japan, Apr. 1998. IEEE.

Fang Liu and Rosalind W. Picard. Finding periodicity in space and time. In International Conference on Computer Vision. Narosa Publishing House, 1998. Also MIT Media Lab PerCom #435.

(Continued)

*Primary Examiner*—Kanji Patel
(74) *Attorney, Agent, or Firm*—Dirk Brinkman; Clifton D. Mueller; Gene V. Vinokur

(57) ABSTRACT

A computer implemented method models a scene in a video acquired by a camera. For each pixel in each frame of the video, a time series of intensities of the pixel is acquired. A harmonic series is extracted from samples of each time series using a sliding window. Distances between the harmonic series are measured. The distances are an estimate of spectral components in an autocorrelation function of underlying dynamic processes in the scene.

15 Claims, 6 Drawing Sheets

OTHER PUBLICATIONS

Zongyi Liu and S. Sarkar. Challenges in segmentation of human forms in outdoor video. In Perceptual Organization in Computer Vision. IEEE, Jun. 2004.

Ramprasad Polana and Randal Nelson. Detecting activities. In Computer Vision and Pattern Recognition, New York, NY, Jun. 1993. IEEE.

Lisa Spencer and Mubarak Shah. Water video analysis. In International Conference on Image Processing, Singapore, Oct. 2004. IEEE.

Chris Stauffer and W.E.L. Grimson. Adaptive background mixture models for real-time tracking. In Computer Vision and Pattern Recognition, vol. 2, Fort Collins, Colorado, Jun. 1999.

Christopher Wren, Ali Azarbayejani, Trevor Darrell, and Alex Pentland. Pfinder: Real-time tracking of the human body. IEEE Trans. Pattern Analysis and Machine Intelligence, 19(7):780-785, Jul. 1997.

\* cited by examiner

MODELING SCENES IN VIDEOS USING SPECTRAL SIMILARITY

FIELD OF THE INVENTION

This invention relates generally to video processing, and more particularly to modeling backgrounds and foregrounds in videos of scenes acquired by a camera.

BACKGROUND OF THE INVENTION

Many computer vision and video surveillance applications seek to identify moving foreground objects, for example, pedestrians, vehicles, or events of interest in different scenes. Generally, something is interesting in a scene when it is substantially different from a background model of a stationary scene acquired by a camera. The simplest background model assumes that the scene is truly static over time.

Over time, the intensity value of an individual pixel in a static background usually follows a normal distribution. Therefore, the uninteresting variability in the scene can be modeled adequately by a unimodal, zero-mean, 'white', Gaussian noise process. Hence, a reasonable model to represent such a statistical distribution is a single Gaussian model, C. R. Wren, A. Azarbayejani, T. J. Darrell, and A. P. Pentland, "Pfinder: Real-time tracking of the human body," PAMI, 19(7), pp. 780-785, July 1997.

Often, a single Gaussian model is inadequate to accurately model the temporal changes of a pixel intensity value in a dynamic background, such a background with changing shadows due to changes in lighting conditions. Therefore, more complex systems include mechanisms for rejecting lighting changes as uninteresting, such as variability caused by cast shadows, Ismail Haritaoglu, David Harwood, and Larry S. Davis, "W[4]: Who? When? Where? What?" Proceedings of FG'98, IEEE, April 1998.

The use of multiple models to describe dynamic backgrounds at the pixel level was a breakthrough in scene modeling. Specifically, methods employing a mixture of Gaussian distributions have become a popular basis for a large number of related applications in recent years.

A mixture of three Gaussian components can be used to model visual properties of each pixel, N. Friedman and S. Russell, "Image segmentation in video sequences: A probabilistic approach," Thirteenth Conference on Uncertainty in Artificial Intelligence, August 1997. That model also uses an expectation-maximization (EM) process to learn the Gaussian Mixture Model (GMM) over time. In a target traffic surveillance application, the intensity value of each pixel is restricted to three hypotheses: road, shadow, and vehicles. Unfortunately, that simple assumption significantly degrades the ability of the GMM to model arbitrary distributions for individual pixels. Moreover, that method is computationally expensive.

Another method allows the scene to be non-static, Chris Stauffer and W. E. L. Grimson, "Adaptive background mixture models for real-time tracking," Computer Vision and Pattern Recognition, volume 2, June 1999. Each pixel is modeled as a mixture of Gaussian distributions with a variable number of Gaussian components. That method represents the background as a multi-modal process, where each mode is a static model plus a zero-mean, white, Gaussian noise process. The models can be updated in real-time using approximations. That video surveillance system has been proven robust for day and night cycles, and for scene changes over long periods of time.

However, for scenes that exhibit very rapid variations, such as ripples on water, ocean waves, or moving grass and trees, that model can result in a distribution with a large variance over a long video sequence. Thus, the sensitivity for detecting foreground objects is reduced significantly.

To address such challenging situations, non-parametric techniques have been developed. Those techniques use kernel densities to estimate properties of each pixel based on multiple recently acquired samples and can adapt to rapid changes in the background of a scene, Elgammal, D. Harwood, L. S. Davis, "Non-parametric model for background subtraction," ECCV 2000, June 2000. That method uses a normal kernel function for density estimation. The model represents a history of recent sample values over a long video sequence.

Another similar technique emphasizes a variable bandwidth kernel for the purpose of adaptive density estimation. As another feature, an optical flow can be used, Anurag Mittal, Nikos Paragios, "Motion-based background subtraction using adaptive kernel density estimation," CVPR 2004, Volume 2, pp. 302-309, June, 2004.

Other techniques that deal with effective scene modeling can be categorized as predictive methods. Predictive methods treat pixel intensity changes as a time series and use a temporal model to predict a next pixel value, based on past observations. The deviation between the predicted value and the actual observation can be used to adjust the parameters of the predictive model.

Other methods use filters. For example, a Kalman-filter can model the dynamic properties of each pixel, Dieter Koller, Joseph Weber, and Jitendra Malik, "Robust multiple car tracking with occlusion reasoning," ECCV'94, May 1994. A simple version of the Kalman-filter, e.g., the Weiner filter, can make probabilistic predictions based on a recent history of pixel intensity values.

An autoregressive model captures properties of dynamic scenes for the purpose of similar textures simulation, G. Doretto A. Chiuso, S. Soatto, Y. N. Wu, "Dynamic textures," IJCV 51(2), pp. 91-109, 2003. That method was improved to address the modeling of dynamic backgrounds and to perform foreground detection in video surveillance, Antoine Monnet, Anurag Mittal, Nikos Paragios, Visvanathan Ramesh, "Background modeling and subtraction of dynamic scenes," ICCV'03, p. 1305, October, 2003; and Jing Zhong and Stan Sclaroff, "Segmenting foreground objects from a dynamic textured background via a robust Kalman Filter," ICCV'03, pp. 44-50, 2003. Although good results have been obtained for some challenging sample videos, the computation cost of using such an autoregressive model is high.

In general, conventional scene modeling suffers from two major disadvantages. First, the computational complexity of those models is inherently high. Every pixel must be processed in each video frame. In many challenging dynamic scenes, a number of different frequency components demand a model with many Gaussian distributions or a highly complicated predictive model to precisely capture the recurrent patterns of motion at a single pixel over time. The performance trade-off between detection accuracy and computation cost is always a hard decision in choosing a pixel-level scene model.

Secondly, the intensity value at individual pixels is very easily affected by noise. In essence, what is lacking in pixel-level models is some higher-level information, which is more robust and can be derived from regions in the frame or even from the entire frame.

One method attempts to guide the pixel-level mixture of a Gaussian model by incorporating feedback from high-level modules, M. Harville, "A framework for high-level feedback to adaptive, per-pixel, Mixture-of-Gaussian background models," ECCV'02, vol. 3, pp. 543-560, May 2002. However, the basis of that framework is still a pixel-level model.

Most of the above referenced techniques have a common assumption of the white Gaussian process. They assume that the observation process has independent increments, Henry Stark and John W. Woods, "Probability, Random Processes, and Estimation Theory for Engineers," Prentice Hall, 2 edition, 1994.

Cyclostationarity

The independent increments assumption means that two samples drawn from the same pixel location are independent. The samples can be drawn from the same probability distribution, but the samples are independent samples from that distribution. A segmentation process, e.g., background subtraction, determines whether samples are drawn from the background distribution, or from some other, more interesting 'foreground' distribution. By assuming independent increments, the techniques rely completely on the appearance of the scene.

Consider the case of a tree blowing in the wind. The multimodal model of Stauffer et al. would model the appearance of the sky, leaves, and branches separately. As the tree moves, an individual pixel can image any of these. The independent increments assumption says that these different appearances can manifest in any order. However, the tree moves with a characteristic frequency response that is related to the physical composition of the tree. That characteristic response should constrain the ways that the various appearances are modeled.

Specifically, given two samples from an observation process: X[k] and X[l], the independent increments assumption states that the autocorrelation function $R_x[k,l]$ is zero when $k \neq l$:

$$R_x[k, l] \triangleq E[X[k]X^*[l]] \quad (1)$$

$$= \sigma^2 \delta[k - l], \quad (2)$$

where $\sigma^2 = E[X[k]X^*[k]]$ is the sample covariance, and $\delta[k-l]$ is a discrete-time impulse function. This function is correct when the process is stationary and white, such as a static scene observed with white noise.

For a situation where the observations are driven by some physical, dynamic process, the dynamic process leaves a spectral imprint on the observation covariance. If the process is simply periodic, then one expects to see very similar observations occurring with a period of T samples. In contrast to the above model, one has:

$$R_x[k, k+T] \neq 0.$$

This process is cyclostationary when the above relationship is true for all time periods.

More generally, wide-sense cyclostationarity is defined as:

$$\mu[k] = \mu[k+T] \forall t, \text{ and} \quad (3)$$

$$K_x[k, l] = K_x[k+T, l+T] \forall k, l, \quad (4)$$

where $K_x[k, l]$ is an autocovariance function for processes that are not zero-mean, see Stark et al., above. These types of processes can be more complex than the simply periodic.

As shown in FIG. 1, these processes are characterized by significant structure in their autocorrelation function, as expressed by a self-similarity matrix 100. The matrix in FIG. 1 is derived from one particular pixel location in a sequence of frames of waves lapping on a beach.

FIG. 2 shows a sample trace 200 from the same pixel. The process is said to be harmonizable when the autocorrelation of the process can be reduced to the form $R_x[k-l]$. That is, the autocorrelation is completely defined by the time difference between the samples.

It is possible to estimate the spectral signature of harmonizable, cyclostationary processes in a compact, parametric representation utilizing a Fourier transform, Dominique Dahay and H. L. Hurd, "Representation and estimation for periodically and almost periodically correlated random processes," W. A. Gardner, editor, Cyclostationarity in Communications and Signal Processing, IEEE Press, 1993.

FIG. 3 shows an example Fourier transform 300 of the same pixel used for FIGS. 2 and 1.

In the case of evenly sampled, discrete observation processes as used in computer vision applications, a fast Fourier transform (FFT) can be used.

It is desired to construct a scene model that represents these spectral signatures of a scene. Furthermore, it is desired to detect changes in the scene that are inconsistent with these spectral signatures. By leveraging these dynamic constraints, it should be possible to achieve higher specificity than a prior art background segmentation process that ignores these constraints. With such a scene model, it should be possible to locate low-contrast objects embedded in high-variance, dynamic scenes that are largely inaccessible to conventional techniques.

Spectral Similarity

Spectral fingerprints can be used as a classification feature. However, prior art spectral methods have only been used to classify stationary foreground objects, Ross Cutler and Larry S. Davis, "Robust real-time periodic motion detection, analysis, and applications," IEEE Transactions on Pattern Analysis and Machine Intelligence, 22(8), pp. 781-796, August 2000; Fang Liu and Rosalind W. Picard, "Finding periodicity in space and time, International Conference on Computer Vision, Narosa Publishing House, 1998; and Yang Ran, Isaac Weiss, Qinfen Zheng, and Larry S. Davis, "An efficient and robust human classification algorithm using finite frequencies probing," Conference on Computer Vision and Pattern Recognition Workshop. IEEE, June 2004.

That is, the objects are either stationary in the video or the objects have been extracted from the scene and stabilized by some other process, typically one of the background segmentation schemes discussed above combined with some kind of tracker framework.

Some prior are representations for temporal textures in videos permit searching for specific activities. Those representations needed to be compact for storage in databases and concise for quick indexing. As a result, those representations summarize the spectral content as a single number, for example, a ratio of harmonic power to non-harmonic power in the signal. This involves extracting specific features from the signal in the Fourier domain.

However, it is desired to make no prior assumptions about what features are interesting in the frequency domain. That is, it is desired to use the Fourier signal directly.

One surveillance method uses spectral fingerprints obtained by an analysis of the full process autocorrelation function. For example, that method can detect pedestrians and pedestrians with 'sprung' masses, e.g., backpacks, satchels, and the like. However, the word 'detect' is somewhat misleading. That method classifies objects as pedestrian and non-pedestrian after the objects are extracted using conventional segmentation techniques. As a result, that method makes an independent increments assumption about the scene dynamics, while exploiting rich descriptions of foreground object dynamics.

Another system uses a priori models, Zongyi Liu and S. Sarkar, "Challenges in segmentation of human forms in outdoor video," Perceptual Organization in Computer Vision, IEEE, June 2004. They model a particular foreground process in a video that is deemed a priori to be interesting, e.g., the periodicity in pedestrian motion. However, they also assume that the foreground object has already been segmented from the background. The periodicity is only used to classify a particular motion after the foreground object has been segmented.

It is desired to construct a model of an observed scene in situ, without having any preconceived knowledge of what the underlying process is. Such a model would be sensitive to anything that is sufficiently different in the scene.

SUMMARY OF THE INVENTION

Previous attempts to perform scene modeling universally have made the assumption that observations of the scene are independent in time. In the vocabulary of the stochastic systems, individual pixels are taken to be samples from stationary, white random processes with independent increments.

Many scenes that could loosely be referred to as static often contain cyclostationary processes. This means that there is significant structure in the correlations between observations across time. A tree swaying in the wind or a wave lapping on a beach is not just a collection of randomly shuffled pixel appearances, but a physical system that has characteristic frequency responses associated with its dynamics.

The scene modeling method according to the invention leverages this fact to perform object detection based solely on the dynamics of the pixels in a scene, rather than the appearance of the pixels as in conventional methods.

Specifically, the invention provides a computer-implemented method that models a scene in a video acquired by camera.

For each pixel in each frame of the video, a time series of intensities of the pixel is acquired.

A harmonic series is extracted from samples of each time series using a sliding window. Distances between the harmonic series are measured.

The distances are an estimate of spectral components in an autocorrelation function of underlying dynamic processes in the scene.

DETAILED DESCRIPTION OF THE PREFERRED EMBODIMENT

Temporal Sequences

Figure 1:
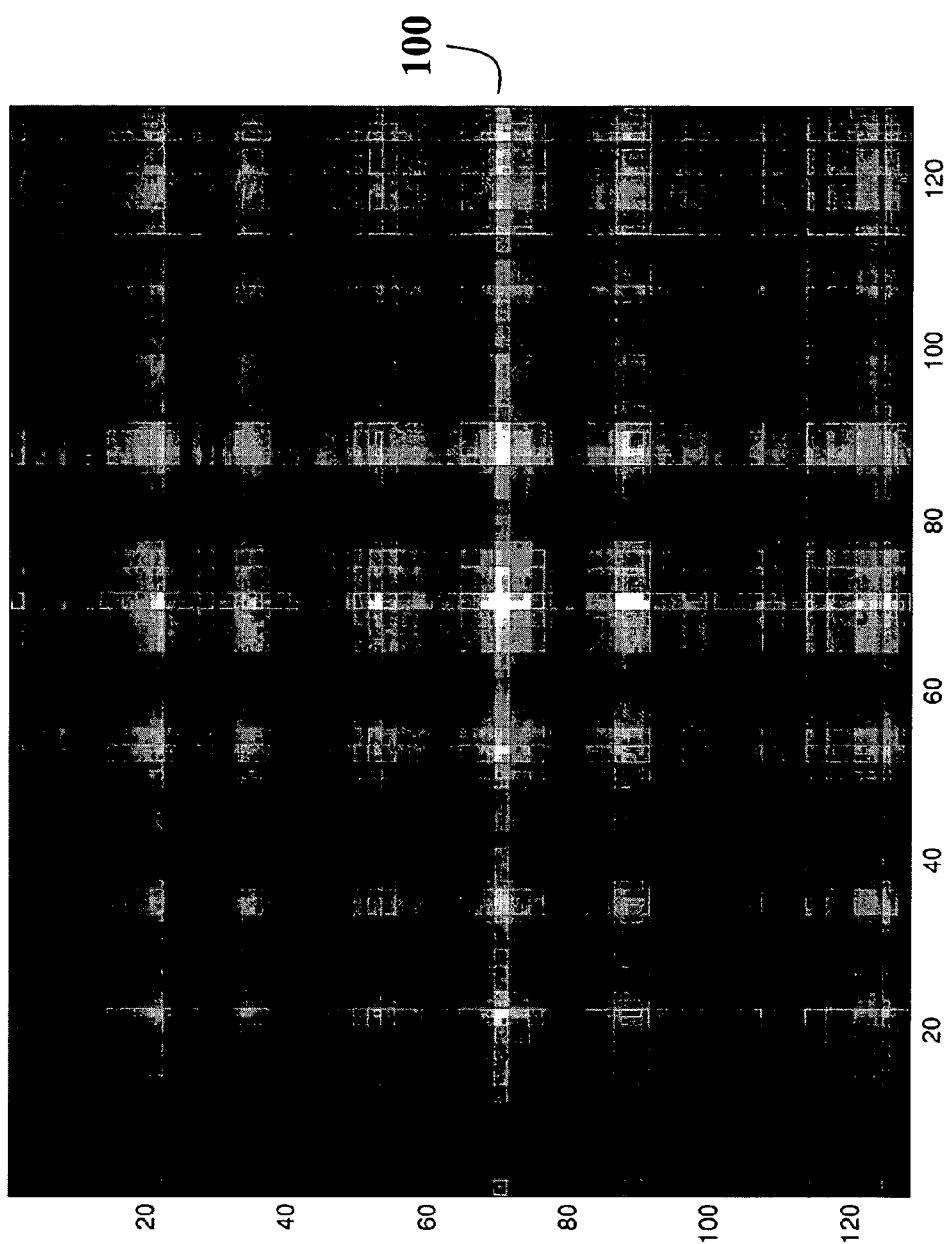
FIG. 1 is a prior art auto-correlation matrix for intensity values of a single pixel in a sequence of images over time.
Figure 2:
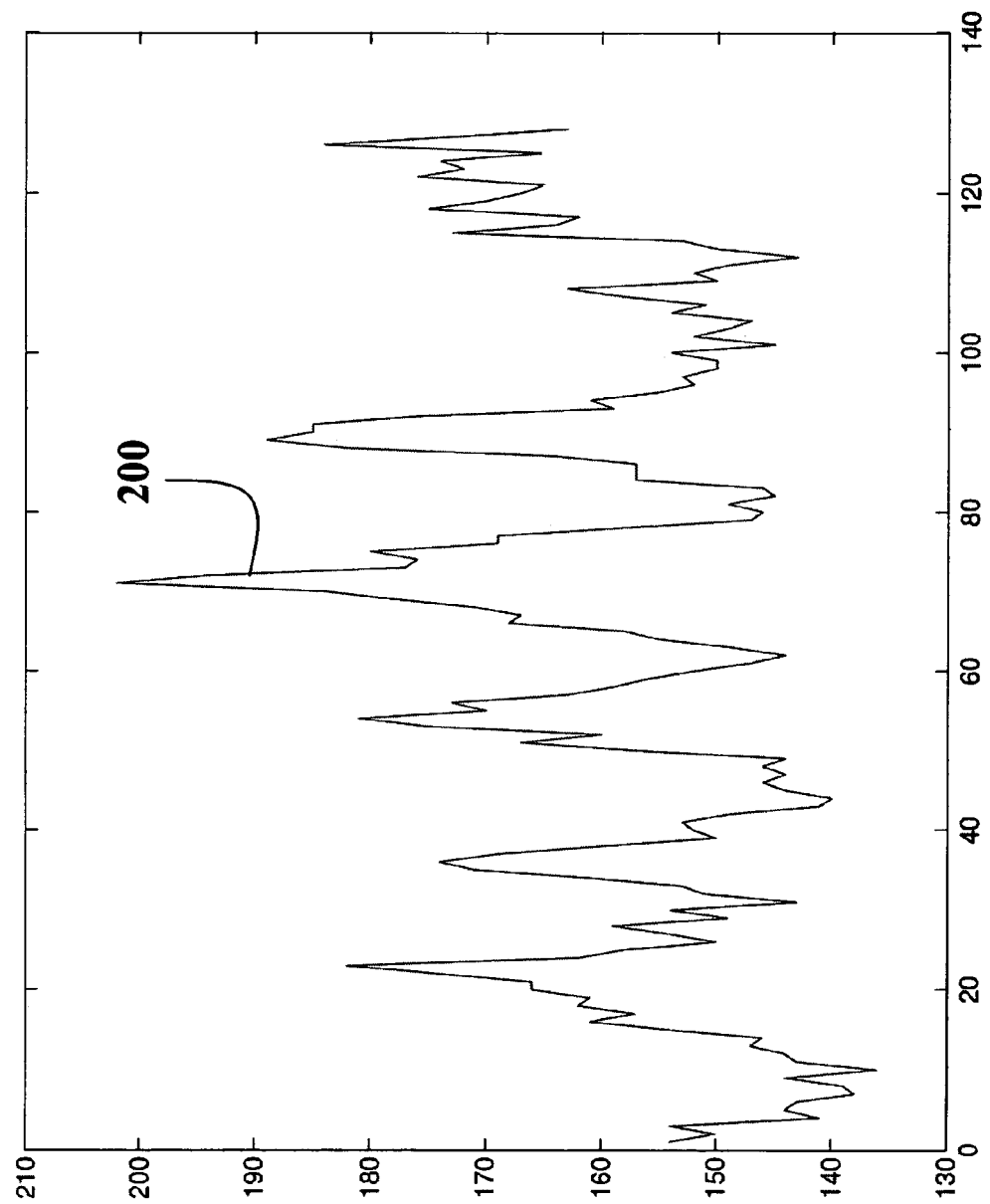
FIG. 2 is a prior art sample trace for the pixel of FIG. 1.
Figure 3:
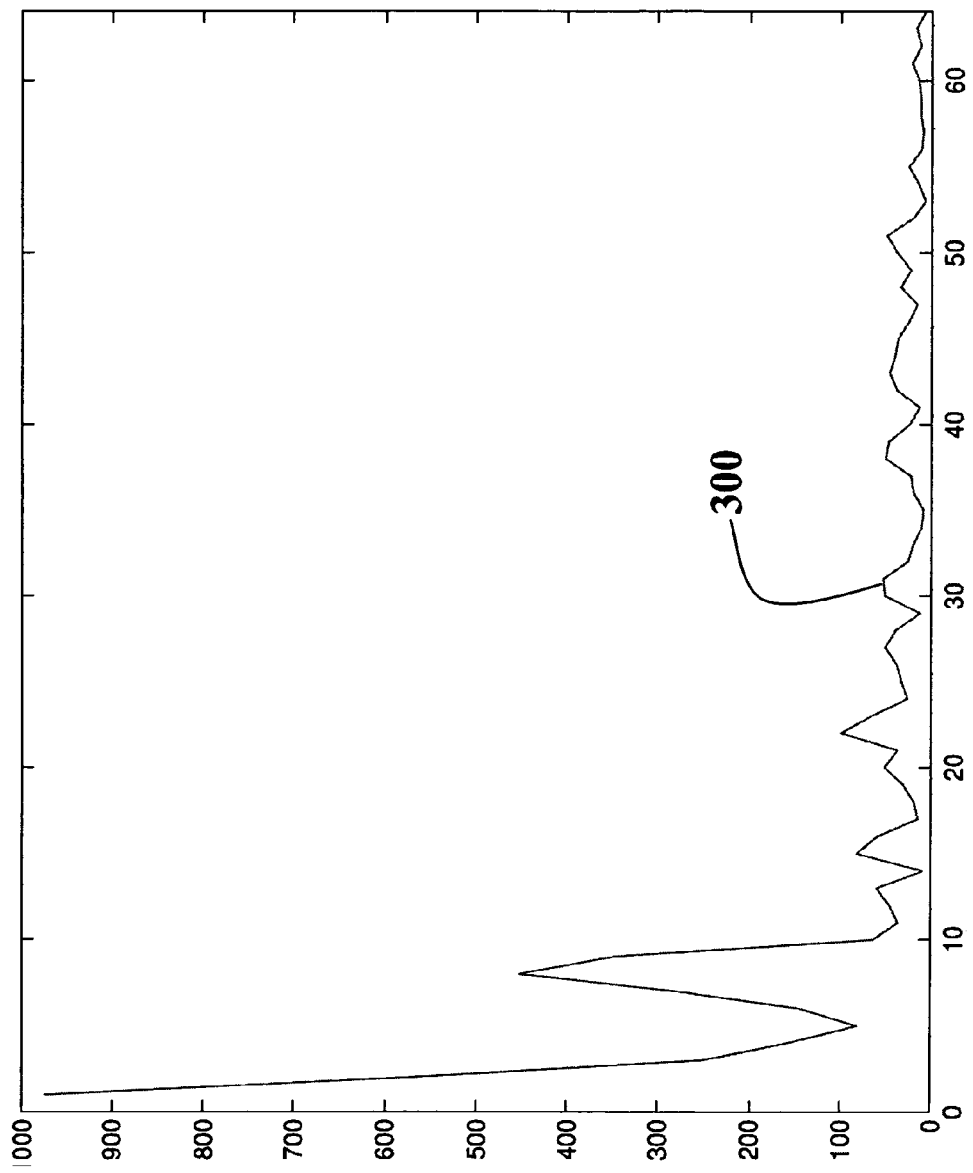
FIG. 3 is a prior art Fourier transform of the sample trace of FIG. 2.
Figure 4:
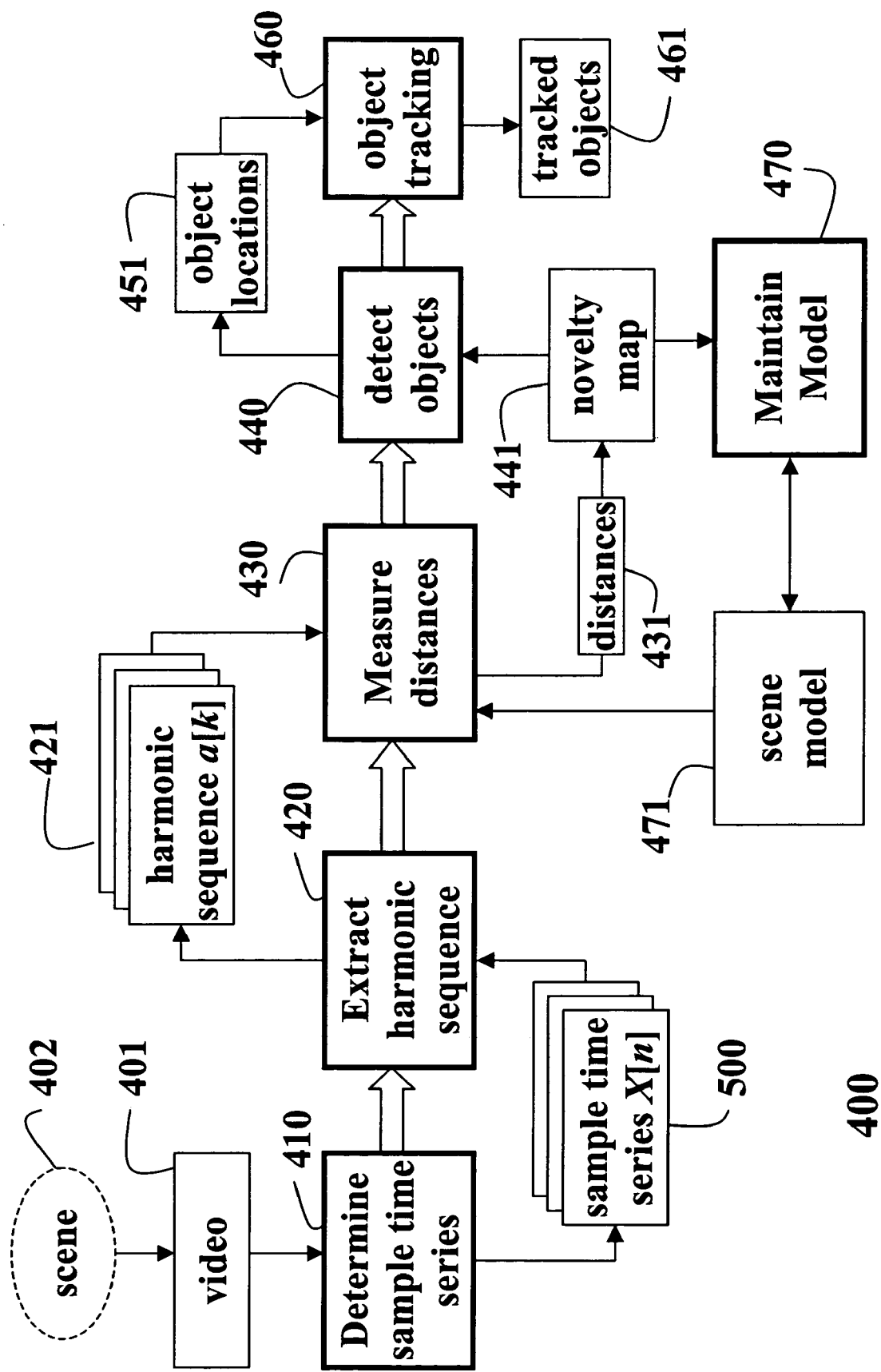
FIG. 4 is a flow diagram of a method for detecting an object according to the invention.

FIG. 4 shows a method 400 according to our invention for modeling a scene 402 in a video 401. For each pixel in a sequence of frames of the video 401, we determine 410 a sample time series X[n] 500 of the intensities of the pixel. Each time series 500 represents the dynamics of the corresponding pixel in the video over time.

Figure 5:
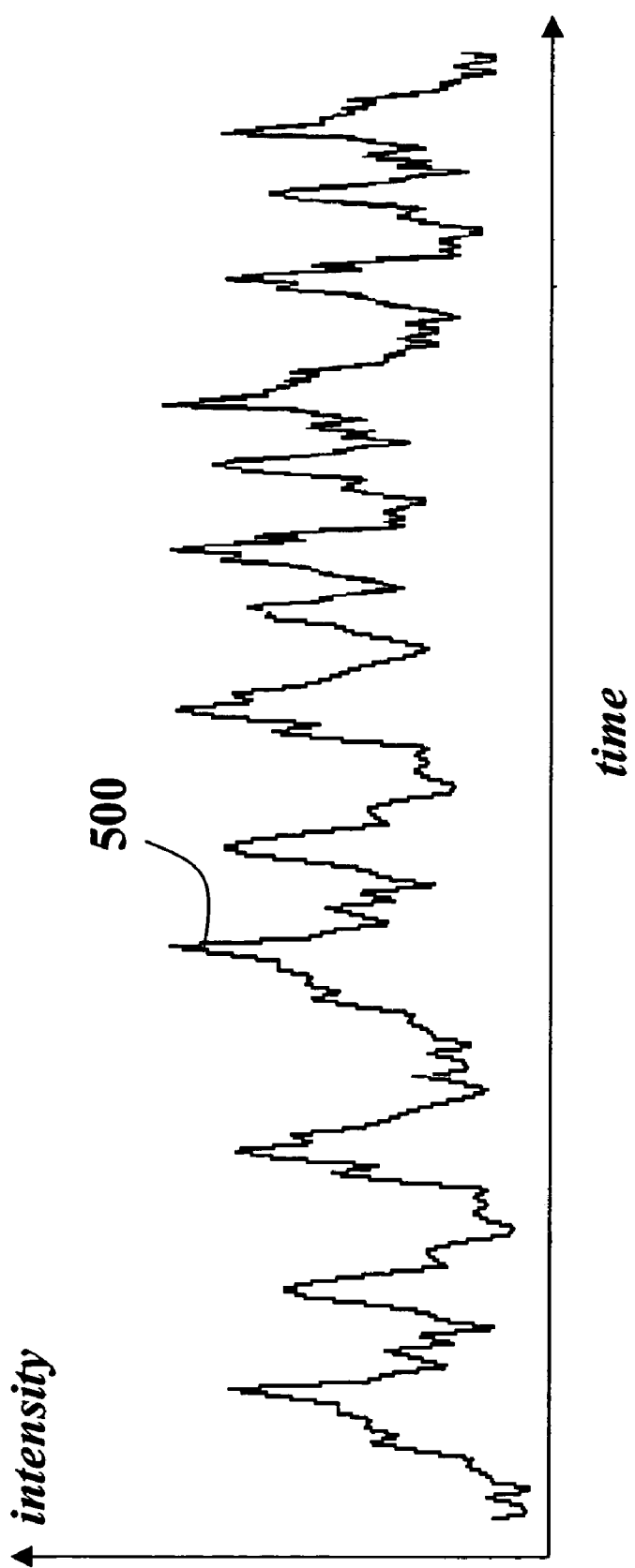
FIG. 5 is a sample trace used by the invention.

FIG. 5 shows an example series 500 for one pixel over about two hundred frames. The time series X[n] 500 are used to maintain 470 a model 471 of the scene.

Harmonic Series Extraction

We extract 420 a harmonic series a[k] 421 from each time series 500 using a discrete Fourier transform, as described below, such that:

$$X[t] = \sum_{k=0}^{N-1} a[k] e^{i 2\pi kt/N},$$

where N is a size of a sliding window, k is the number of samples in the window, i is the square root of −1, and t is time.

We use only the magnitudes $\|a[k]\|$ of the Fourier coefficients in the harmonic series 421. We assume that the harmonic series are an estimate of the spectral components in an autocorrelation function of the underlying dynamic process in the scene 402.

The harmonic series of an initial training sequence of frames is taken to be identical to a background model for each pixel. Henceforth, these harmonic series are referred to either in the aggregate with a single letter, in this case a, or by the individual components, in this case $\|a[k]\|$.

The length of the window N is selected empirically. If the window is too small, then low-frequency components are modeled poorly. However, a large window requires more computation and, hence, increases the latency of the system.

Short-Time Fourier Transform

In particular, our Fourier transform is a short-time Fourier transform (STFT). The STFT determines a sinusoidal frequency and phase of a signal, e.g., the time series, as the signal changes over time.

Simply described, a window function, which is non-zero for a short period of time, is multiplied by the function to be transformed. The window function is applied to avoid discontinuities at the beginning and the end of a set of data.

The window function, such as a Gaussian function, usually has a cone shape centered on zero. The data to be transformed is partitioned into overlapping sets. Each data set is Fourier transformed, and the complex result is added to a matrix, which stores the magnitude and phase for each data point in time and frequency. The matrix can be expressed as:

$$s[k, w] = \sum_m X[n+m] w[m] e^{-jwm}, \qquad (5)$$

for the signal X[n] and the window w[n].

However, the STFT has a fixed resolution. Selecting a wide window gives a good frequency resolution but a bad time resolution. A narrow window gives a good time resolution but a bad frequency resolution. These are called narrow-band and wide-band transforms, respectively.

Determining Novelty for Each Pixel

For each current sample X[n'], we extract a new harmonic series representation, ||b[k]|| for the current sample using X[n'], and a window of N−1 previous samples of the time series. We take this to represent a process underlying the current observations of the scene.

To determine whether two time series were generated by the same underlying process, we measure 430 a $L_2$-norm of the distance 431 between the two representative harmonic series a and b:

$$d = \langle a, b \rangle = \left( \sum_{k=0}^{N-1} (\|a[k]\| - \|b[k]\|)^2 \right)^{1/2}. \tag{6}$$

The distance d is a measure of a difference between the underlying processes in the scene.

Small distances mean that the samples in the time series are drawn from the same process, and therefore represent observations consistent with the model of the scene. Large distances mean that the samples are drawn from different processes. Thus, the distance d is a measure of 'novelty' in the new sequence, relative to the scene model 471. The distances 431 can be used to construct a novelty map 441 representing the scene.

The Novelty Map

For a frame with P pixels, d[p] is the novelty at a given pixel location p, as measured above. For all the pixel locations in a sequence of frames, the distances d[p] collectively describe the location and amount of novelty in the sequence.

If we arrange the d[p] into an aggregate image, where the value of the image at pixel location p is d[p], then the image D is said to be the novelty map 441. The novelty map can also be called a distance map. The novelty map is a visual representation indicating the spatial characteristics of novelty in the scene.

To detect 440 objects 461, we find locations $p_n$ 451 in the novelty map with the greatest novelty, i.e., the largest distances $$p_n = \arg\max_p d[p],$$

and say that $p_n$ is the location of a 'novel' moving object in the scene.

The method can be improved by only detecting objects if d[$p_n$] is greater than a predetermined threshold T. It is also possible to use spatial information in the novelty map to reject objects that are too big, too small, or in the wrong location, based on a priori knowledge. Multiple objects can be detected concurrently.

After objects have been detected 440 and located, the objects can be tracked 460.

Adaptation

Because the signals we acquire are almost never completely stationary, we add a simple exponential update step to our method to maintain 470 the model 471. The exponential update smoothly 'blends' observations into the model in case the process is not stationary in the long term. The update step combines the current estimate of the harmonic sequence with the estimate of the harmonic sequence of the scene:

$$a_{t+1}[k] = a_t[k] + \alpha(a_t[k] - b_t[k]),$$

where $\alpha$ is a predetermined exponential mixing factor, e.g., 0.98.

Figure 6:
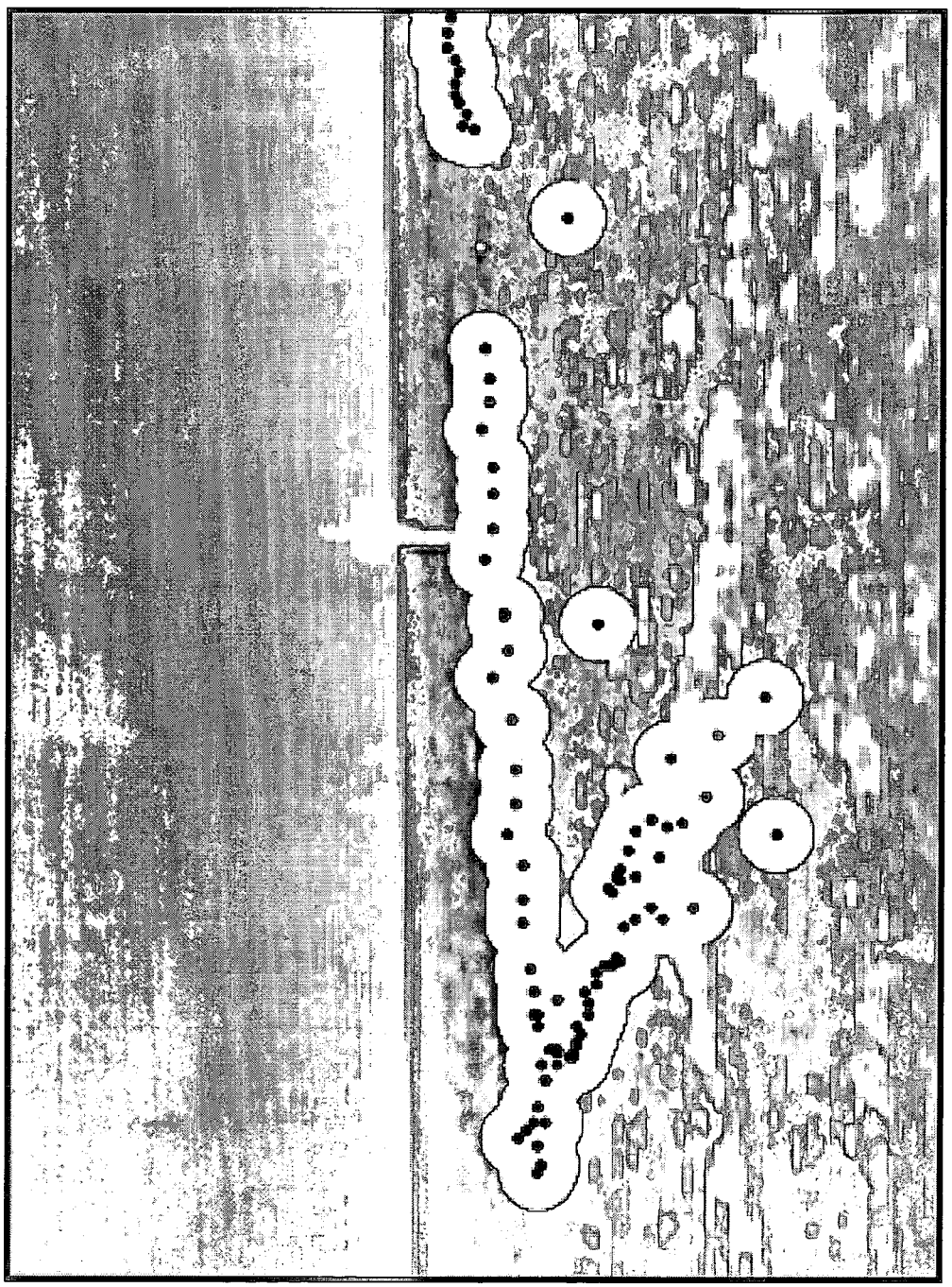
FIG. 6 is an example frame depicting the object tracking results using the adaptive FFT-based scene model and a 32-point window.

FIG. 6 shows the results obtained for tracking two thousand frames in an infrared video of a small boat moving though offshore waves. The boat is a low-contrast object in the infrared video, and the wave action would be a significant dynamic distraction for any conventional background segmentation modeling method.

EFFECT OF THE INVENTION

The invention provides a method for modeling a scene in a video. The method is based on the dynamics of pixels, rather than their appearance. The method models cyclostationary processes.

The invention correctly interpret videos of scenes with large high-variance distracters in the presence of small low-contrast objects. Such scenes would be difficult to process with conventional segmentation methods.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for modeling a scene in a video acquired by camera, comprising:
   acquiring, for each pixel in each frame of a video of a scene, a time series of intensities of the pixel, and in which an initial training sequence of the frames is taken to be identical to a background model for each pixel;
   extracting a harmonic series from samples of each time series; and
   measuring distances between the harmonic series, the distances being an estimate of spectral components in an autocorrelation function of underlying dynamic processes in the scene.

2. The method of claim 1, in which the extracting uses a discrete Fourier transform and a sliding window of the samples from the time series.

3. The method of claim 2, in which the harmonic series use only magnitudes of Fourier coefficients of the discrete Fourier transform.

4. The method of claim 2, in which a length of the window is selected empirically.

5. The method of claim 2, in which the discrete Fourier transform is a short-time Fourier transform that determines a sinusoidal frequency and phase of the time series.

6. The method of claim 1, in which the distance is a $L_2$-norm of the distances.

7. The method of claim 1, in which small distances mean that the samples are drawn from the same underlying process, and therefore represent observations consistent with a model of the scene, and large distances mean that the samples are drawn from different processes.

8. The method of claim 1, further comprising:
constructing a novelty map representing the scene.

9. The method of claim 8, in which the novelty map is a visual representation indicating spatial characteristics of novelty in the scene.

10. The method of claim 7, in which the large distances represent locations of moving objects in the scene.

11. The method of claim 10, in which the large distances are greater than a predetermined threshold.

12. The method of claim 10, further comprising:
rejecting moving objects based on a priori knowledge.

13. The method of claim 12, in which the a priori knowledge includes a size and location of the moving objects.

14. The method of claim 10, further comprising:
tracking the moving objects.

15. The method of claim 1, in which the background model is updated exponentially.

* * * * *